United States Patent [19]

McFalls et al.

[11] Patent Number: 4,685,735
[45] Date of Patent: Aug. 11, 1987

[54] TILT WORM RECLINER

[75] Inventors: Bob L. McFalls, Roseville; Timothy S. Myers, Warren; Chester Fudala, Troy, all of Mich.

[73] Assignee: Ferro Manufacturing Corporation, Southfield, Mich.

[21] Appl. No.: 712,690

[22] Filed: Mar. 18, 1985

[51] Int. Cl.[4] ............................................. B60N 1/02
[52] U.S. Cl. .................................... 297/362; 297/361
[58] Field of Search ............... 297/361, 362, 354, 355; 74/458, 500

[56] References Cited

U.S. PATENT DOCUMENTS

| | | |
|---|---|---|
| 1,797,460 | 3/1931 | Wildhaber ........................ 74/458 X |
| 2,180,505 | 11/1939 | Bradfield, Jr. ........................ 297/362 |
| 2,930,248 | 3/1960 | Wildhaber ........................ 74/458 X |
| 3,079,808 | 3/1963 | Wildhaber ............................ 74/458 |

FOREIGN PATENT DOCUMENTS

| | | |
|---|---|---|
| 2166311 | 11/1973 | Fed. Rep. of Germany ...... 297/362 |
| 2321184 | 11/1974 | Fed. Rep. of Germany ...... 297/362 |
| 2822135 | 11/1979 | Fed. Rep. of Germany ...... 297/362 |

*Primary Examiner*—Kenneth J. Dorner
*Assistant Examiner*—Mark W. Binder
*Attorney, Agent, or Firm*—Harness, Dickey & Pierce

[57] ABSTRACT

A recliner for an automotive vehicle seat comprising a seat mount, an adjustable seat back bracket pivoted to said seat mount and having a substantially flat end portion provided with a sector having an arcuate series of straight spur teeth concentric to the pivot axis between said mount and bracket, and a tilted worm carried by said mount having a helically threaded portion in mesh with the teeth of said sector, the worm being tilted an angle to correspond to the helix angle of its thread.

4 Claims, 3 Drawing Figures

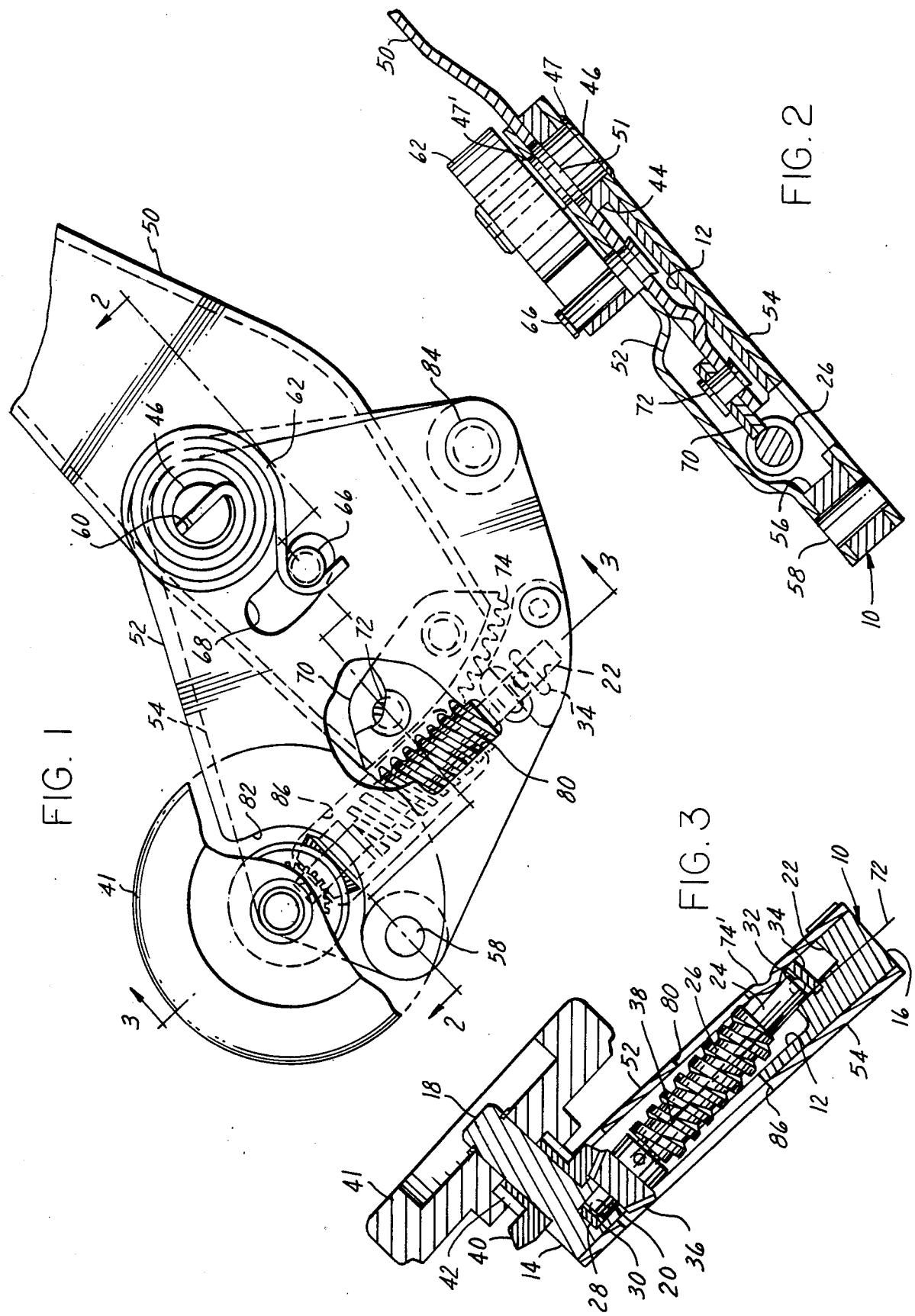

TILT WORM RECLINER

SUMMARY OF THE INVENTION

The invention relates to a vehicle seat construction having a seat back adjustable relative to the seat. The seat is carried by seat mounts, which may be adjustable fore and aft and vertically. The seat back is carried by seat back brackets, which are elongated and pivoted by pivot connections to the respective seat mounts. The mounts and brackets at opposite ends or sides of the seat construction are essentially identical, and only a single set of mount and bracket is illustrated herein.

The seat back bracket is elongated comprises an essentially flat plate suitably shaped for reinforcement and is connected to the mount intermediate its ends. At one end the bracket is provided with a flat, plate-like sector having an arcuate series of straight spur teeth occupying a plane perpendicular to the axis of said pivot connection, and concentric with the axis of said pivot connection.

The seat mount comprises a flat base portion provided with spaced laterally extending bosses or enlargements which provide journals for a shaft carrying a worm thereon. Since the teeth of the sector are straight spur teeth, such as readily formed in a simple stamping operation the worm carried by the seat mount is tilted in conformity with the helix angle or inclination of the thread or threads of the worm. Thus, the portions of the worm thread extending into the spaces between sector teeth are properly conjugate to the sector teeth.

BRIEF DESCRIPTION OF THE DRAWINGS

FIG. 1 is a side elevation of the seat mount and seat back bracket assembly.

FIG. 2 is a section on the broken line 2—2, FIG. 1.

FIG. 3 is a section on the line 3—3, FIG. 1.

COMPLETE DESCRIPTION

In automotive vehicles, it is customary to provide a front seat construction in which a seat is adjustable fore and aft, and in which the front and rear edges of the seat are separately vertically adjustable to adjust the height of the seat or the inclination of the seat about a transverse horizontal axis. While forming no part of the present invention, it may be assumed that the seat mounts disclosed herein are so adjustable.

The present invention is concerned with mechanism for adjusting the inclination of the seat back relative to the seat. Since the seat is supported by seat mounts at opposite sides thereof, and the seat back is similarly supported by adjustable seat back brackets pivotally connected to the seat mounts, only the manually adjustable bracket and the seat mount to which it is pivotally connected is illustrated herein. It will be understood that when the seat back bracket is moved to adjusted position, the seat back is adjusted as disclosed herein.

The front seat construction at the driver's side comprises a seat mount assembly in which a housing 10 has a flat base portion 12 provided with laterally projecting spaced bosses 14 and 16. The boss 14 has an integral post 18 projecting therefrom at an oblique angle as will subsequently be described. In addition, the boss 14 is provided with a cylindrical recess 20 disposed with its axis at an angle of 90° with respect to post 18. The boss 16 is provided with an open sided slot 22.

The housing is most conveniently formed by a metallic die casting which may for example be zinc or aluminum.

The recess 20 and slot 22 receive opposite end portions of a shaft 24 carrying the tilted worm 26. A thrust plate 28 is received in recess 20, and a bearing ball 30 is received in a cup at the adjacent end of worm shaft 24 and engages thrust plate 28. Similarly, a ball 32 is received in a cup at the opposite end of the worm shaft and engages a thrust plate 34 disposed in grooves provided in slot 22, as illustrated in FIG. 3.

Fixed adjacent the upper end of worm shaft 24 as seen in FIG. 3 is a bevel pinion 36. It will be noted that worm 26 and bevel pinion 36 have an axis of rotation indicated at 38 which extends at right angles to the axis of post 18, but is inclined at a small angle with respect to the plane of base 12.

Rotatably mounted on the post 18 is a manually operated bevel gear 40 which is meshed in driving relation to bevel pinion 36. Bevel gear 40 is connected to a manually rotatable knob 41 by a non-circular connection indicated at 42.

Base 12 of housing 10 is provided with a boss 44 which is apertured to receive the main pivot post 46 on which the seat back bracket 50 is pivotally mounted. Post 46 has an enlarged annular flange 51 engaging said boss 44.

Housing 10 has cover plates 52 and 54 secured to opposite sides thereof, and has a laterally extending boss 56 which abuts inner surfaces of the cover plates and receives a fastener 58.

Pivot post 46 extends through openings in the cover plates and is riveted in place at 47, 47' as illustrated in FIG. 2. The post is slotted as seen at 60 and the slot serves as an anchor for one end of coiled counterbalance spring 62, the other end 64 of which engages a stud 66 fixed to the bracket 50 and extending through an arcuate slot 68 in cover 52.

The lower end of bracket 50 has a toothed insert 70 attached thereto by rivets 72. Insert 70 comprises a pair of plates which provide an arcuate series of teeth 74. In accordance with the present invention, teeth 74 are straight spur teeth which may accurately and economically be cut in a stamping operation. The arcuate series of teeth 74 are concentric with the axis of pivot post 46, and are in mesh with the teeth or thread of worm 26.

In order to provide proper meshing relation between straight spur teeth 74 of insert 70, and the helical thread of worm 26, it is necessary to tilt the worm at a small angle with respect to the plane occupied by the arcuate series of teeth. Thus, as seen in FIG. 3, the axis 38 of the worm is shown as tilted or inclined with respect to a line 72 at an angle somewhat less than 5°, which is the complement of the helix angle of the worm thread. Line 72 as seen in FIG. 3, is perpendicular to the axis of the post 51, and parallel to the plane of teeth 74.

Accordingly, the thread of the worm passes between the adjacent straight spur teeth of the sector in proper tangent relation.

Plate 52 as best seen in FIG. 3 has an embossment 74' which engages the worm shaft 24 after it has been introduced laterally into the slot 22 of boss 16. In addition, plate 52 retains thrust plate 34 in position. At the pivot post 46, plates 52 and 54 together with boss 44, provide firm support for the pivot post which as previously described has rivet portions 47, 47' engaging outer surfaces of plates 52 and 54.

Upper cover plate 52 is provided with a clearance opening 80 to receive the lower end of worm 26 as seen in FIG. 3, and has an arcuate recess 82 in its upper end (as seen in this FIG. 1) to accomodate the bevel gear 40. Lower plate 54 is provided with a clearance opening 86 to accomodate bevel pinion 36.

In addition to the interconnection between housing 10 and plates 52 and 54 provided at boss 56 and at the boss 44 which received pivot post 46, a third interconnection is provided at 74, which may be identical with that shown in boss 56.

We claim:

1. A recliner for an automotive vehicle seat construction comprising:
   a seat mount,
   an adjustable seat back bracket for supporting a seat back,
   a pivot connection between said mount and said bracket to provide for adjustment of said seat back between forwardly and rearwardly inclined positions, said seat back bracket being elongated and in the form of a generally flat plate with a sector at one end having an arcuate series of straight spur teeth occupying a plane perpendicular to the axis of said pivot connection and concentic with the axis of said pivot connection,
   an integral housing structure having a base portion with first and second bosses projecting laterally from said base portion, said first boss defining a first journal and having a projecting post, and said second boss defining a second journal, said housing further supporting said pivot connection,
   a shaft having first and second ends supported by said first and second journals, respectively,
   helical worm means on said shaft having a thread of a predetermined helix angle,
   first bevel gear means on said shaft adjacent said first end of said shaft,
   second bevel gear means meshing with said first bevel means gear,
   a knob journalled for rotation on said projecting post and coupled to said second bevel gear means to enable rotation of said second bevel gear means,
   said first and second journals being positioned to locate the axis of rotation of said shaft at a position inclined to the plane occupied by said sector teeth to tilt said worm means substantially at said thread helix angle thereby providing for meshing engagement of said worm thread with said spur teeth with said worm thread being in a substantially tangent relationship with the sides of the engaged spur teeth of said sector.

2. The recliner according to claim 1 further comprising: a first thrust plate disposed in said first journal and a second thrust plate disposed in said second journal, and bearings balls disposed between said shaft and said thrust plates to rotatably support said shaft.

3. The recliner according to claim 1 wherein said pivot connection is defined by a third boss having an aperture formed by said housing base and a pivot post having an annular flange engaging said third boss.

4. The recliner according to claim 1 further comprising; a pair of plates secured on opposite sides of said housing.

* * * * *